Feb. 23, 1960 P. G. HOLT 2,926,222
AUTOMATIC LIMIT AND RETURN TRIPPING APPARATUS
Filed Feb. 6, 1958
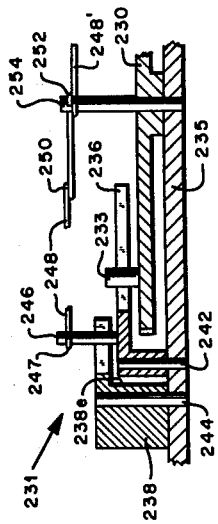
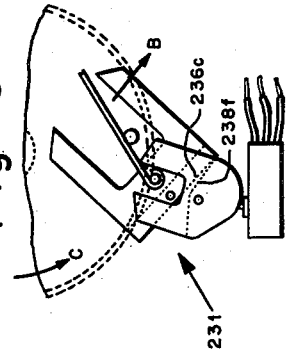
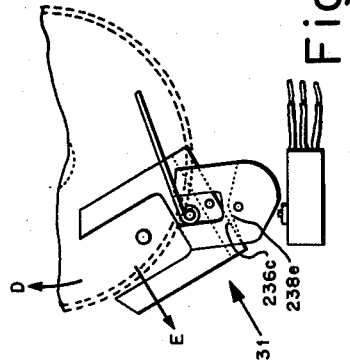
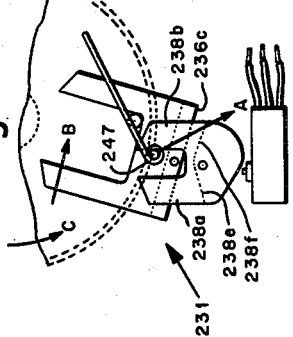
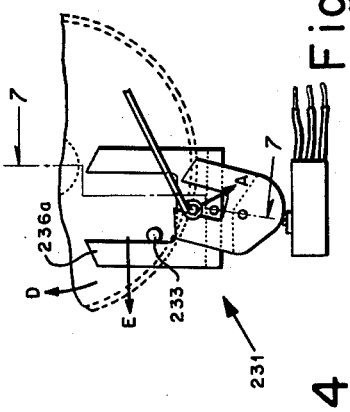
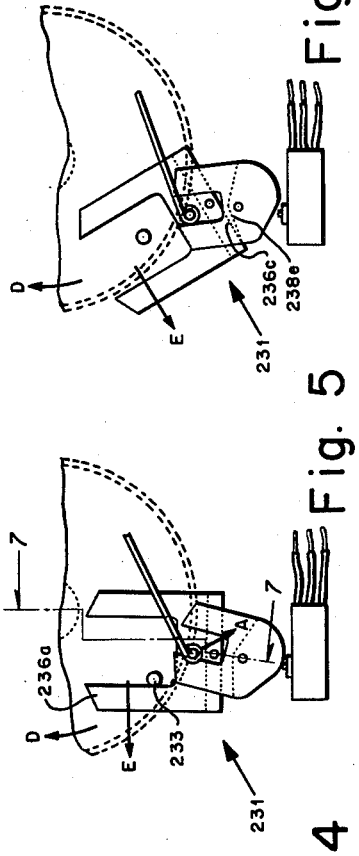
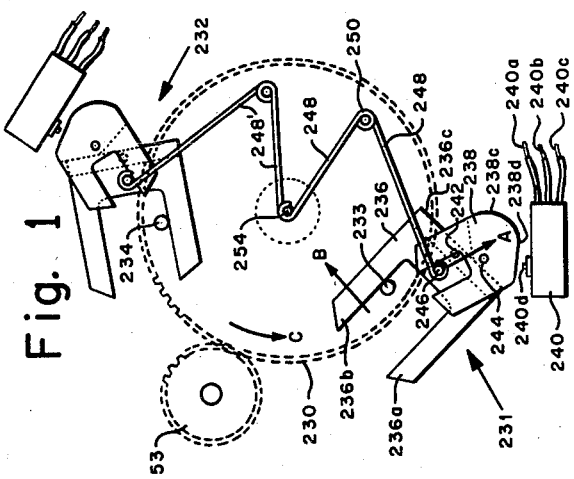
INVENTOR.
PLINY G. HOLT
BY
ATTORNEYS

United States Patent Office 2,926,222
Patented Feb. 23, 1960

2,926,222

AUTOMATIC LIMIT AND RETURN TRIPPING APPARATUS

Pliny G. Holt, Carmel, Calif., assignor to the United States of America as represented by the Secretary of the Navy Application February 6, 1958, Serial No. 713,771

6 Claims. (Cl. 200—47)

(Granted under Title 35, U.S. Code (1952), sec. 266)

The invention described herein may be manufactured and used by or for the Government of the United States of America for governmental purposes without the payment of any royalties thereon or therefor.

The present invention relates to an automatic limit and return tripping mechanism and more particularly to an automatic limit and return tripping mechanism having two stable states for the actuation of microswitches to effect the temporary reversal of electrically operated devices.

In certain types of navigational equipment, rotary potentiometers are used for supplying the inputs to electrical resolvers and when for one reason or another a wiper arm reaches one extreme position it continues into the opposite end of the potentiometer coil, thereby preventing jamming of the wiper. In navigational and other type systems using mechanical resolvers which include slide members and the like, such as the resolvers used in co-pending application Serial No. 713,772, filed February 6, 1958, for Pilot's Automatic Dead Reckoning Equipment, one or more of the controllable mechanical elements may be run into a stop position. Without automatic apparatus of the type herein disclosed to provide switching for energizing the drive in reverse to bring the member back into its operative range, the operator would be required to shut down the equipment and manually accomplish this function. This is time consuming, inefficient, requires excessive attention of the operator who may have other duties to perform, and is generally undesirable aboard aircraft where as many routine duties as possible should be removed from the crew members.

The present invention overcomes the disadvantages of manual arrangements described above by providing switching apparatus for automatically reversing the direction of movement of the mechanical element as it reaches its stop position and bringing it back well into its operative range before returning it to its normal operation.

It is a first object of this invention to provide an automatic limit and return tripping mechanism of relatively simple construction.

Another object of the present invention is a novel switching arrangement for tripping at different points depending upon the direction of movement.

It is still another object of this invention to provide a cam operated switching arrangement for tripping at selectable points, depending upon the direction of rotation of the cam.

A further object of this invention is the provision of a spring actuated camming apparatus for tripping into actuation at selectable points, depending upon the direction of rotation.

For these and other objects in view as will hereinafter more fully appear, reference is now made to the following description taken in connection with the accompanying drawing in which:

Fig. 1 illustrates one embodiment of this invention incorporated into a double acting switching arrangement;

Figs. 2, 3, 4, 5 and 6 illustrate one of the switching mechanisms shown in Fig. 1 in various stages of movement; and Fig. 7 is a section along 7—7 of Fig. 3.

The automatic limit and return tripping mechanism illustrated in the drawing is shown in a typical use for limiting the movement of a slide element which is positioned axially in accordance with a navigational parameter, such as aircraft speed. Under certain circumstances, as explained in the aforementioned application, because of the position of the servo loop in relation to actual conditions when the apparatus is first turned on, the slide element under the control of the servo loop may be driven in the wrong direction so that it tends to jam up against its end position. When this occurs, the present apparatus trips to actuate a switch to automatically supply a correction current at opposite phase to the motor driving this slide element, thereby returning the latter to a selected intermediate position where the mechanism herein provided again trips to cause removal of the corrective current and reapplication of the control signal.

Referring to Fig. 1 for a plan view of the apparatus, there is shown a wheel or gear 230 toothed along its circumference and driven by a pinion 53 which indicates the position of the slidable or other limiting element (not illustrated) which is being controlled by a servo motor or other electrical apparatus (not illustrated). Wheel 230 is provided with a pair of tripping mechanisms 231 and 232 coacting with wheel 230 as hereinafter described, and has a pair of pins 233 and 234. Wheel 230 is mounted for angular or pivotal movement on the wall of casing 235 by a stationary pin or shaft 254 as best shown in Fig. 7.

Limiting the description of the tripping mechanisms for the time being to mechanism 231, the latter consists of a forked member 236, a cam member 238, and a microswitch 240 having the three electrical leads 240a, 240b and 240c and a button 240d biased in the up position as is understood in the art. Forked member 236 has a pair of legs 236a and 236b and a flat, bottom surface 236c, and is mounted for pivotable movement on a stationary pin or shaft 242 extending from casing 235. Forked member 236 is located above wheel 230. Cam member 238 has a pair of legs 238a and 238b, a circular cam surface 238c, a cutoff section 238d, and shoulders 238e and 238f on its underside. Cam member 238 is mounted for pivotable movement on a stationary pin 244 extending from casing 235. When cam member 238 is positioned as illustrated in Fig. 4 with the circular camming surface 238c opposite microswitch button 240d, the latter is depressed. When cam member 238 is located in a more counterclockwise position as shown in Fig. 1 with button 240d opposite the cutoff section 238d, the former remains in its unactuated or raised position as illustrated. The center of the curve of circular section 238c is pin 244 about which member 238 rotates. Forked member 236 is provided with a pin 246 adjacent shaft 242 but extending upwardly to pass between legs 238a and 238b of cam member 238. Adjacent the top of pin 246 is coiled one end 247 of a spring member 248 which extends as illustrated in Fig. 1 through coiling at 250 and its opposite end 252 coiled about the shaft 254 extending from casing 235 through the center of wheel 230. Spring member 248 is biased so that it exerts a force in the direction indicated by arrow A, due to the coiling at 250. Thus forked member 236 is biased at its pin 242 roughly in a direction of its supporting shaft 242. When unit 236 is in the position illustrated in Fig. 1, the force of spring 248 in the direction of arrow A from pin 246 passes to the left of shaft 242 and this tends to pivot or snap forked member 236 in a counterclockwise direction. In Fig. 5 where the direction of arrow A passes to the right of supporting shaft 242, forked unit 236 tends to be pivoted in a clockwise direction.

For a description of the operation of tripping mechanism 231 reference is made to the sequence of Figs. 1 through 6. In Figs. 1 through 4, wheel 230 is shown reaching its extreme counterclockwise position at the instant that it actuates microswitch 240 by depressing button 240d. Pin 233 engages with leg 236b of forked member 236 in Fig. 1 and pivots the latter in the direction of arrow B to the point where the force indicated by arrow A is to the right of mounting pin 242 as shown in Fig. 2. This results in forked member 236 being tripped clockwise so that its bottom surface 236c engages with the surface 238f of cam member 238 as illustrated in Fig. 3. Under the influence of spring 248, forked member 236 and cam member 238 complete their movement and come to rest as illustrated in Fig. 4, with pin 246 acting as limit or stop for member 238. Button 240d of microswitch 240 was depressed at the instant indicated in Fig. 3. By electrical apparatus (not shown) the drive for pinion 53 is reversed due to the internal switching of microswitch 240. The reversal of wheel 230 to move in the direction of arrow D results in pin 233 raising leg 236a of forked member 236 to pivot in the direction of arrow E, as shown in Figs. 4 through 6. However, instead of releasing button 240d in the position of pin 233 shown in Fig. 3, the latter has to move all the way to the position shown in Fig. 5 where force in the direction of arrow A exerted by spring 248 just begins to pass to the left of shaft 242 to cause the tripping of forked member 236 in the counterclockwise direction (arrow E). Surface 236c engages with abutment 238e of cam member 238 and button 240d comes off cam surface 238c, thereby releasing microswitch 240 into its normal, biased position. The apparatus driving pinion 53 and wheel thus return to their normal movement. In a similar manner, tripping mechanism 232 illustrated in Fig. 1 provides a limit control for the clockwise limits of movement of wheel 230 and pinion 53.

Thus, there has been provided novel mechanical limit and return tripping apparatus for automatically being actuated at some preselected position and providing means for being oppositely actuated only at some other preselected return position. The apparatus described is mechanical in construction and relatively free from features which would limit its accuracy. It is relatively quick acting at the point it is designed to act, will trip at the same point each cycle, and is positive in its action. Thus, it is reliable and dependable. In addition, the construction of the apparatus described above is relatively simple as compared to other constructions designed to accomplish this same purpose.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. Reversible tripping mechanism having two stable states comprising, in combination, actuator means mounted for pivotal movement through an angle less than 360 degrees, control means adjacent said actuator means pivotable between first and second limits of movement less than 360 degrees and having an intermediate position between said limits, means included in said actuator and control means for said control means to drive said actuator means in the same angular direction as said control means when the latter approaches one of said limits, means biasing said control means to pivot in the direction of its limit on the same side of said intermediate position as said control means so that said control means is normally in one of its limits forming one of the stable states of said mechanism, and means for overcoming said bias for urging said control means past said intermediate position to trip said mechanism into the other of the stable states of said mechanism.

2. Reversible tripping mechanism having two stable states comprising, in combination, actuator means mounted for pivotal movement through an angle less than 360 degrees, means included in said actuator means for performing actuation over a particular portion of said movement, control means adjacent said actuator means pivotable between first and second limits of movement less than 360 degrees and having an intermediate position between said limits, means included in said actuator and control means for said control means to drive said actuator means in the same angular direction as said control means when the latter approaches one of said limits, means biasing said control means to pivot in the direction of its limit on the same side of said intermediate position as said control means so that said control means is normally in one of its limits forming one of the stable states of said mechanism, and means for overcoming said bias for urging said control means past said intermediate position to trip said mechanism into the other of the stable states of said mechanism.

3. Reversible tripping mechanism having two stable states comprising, in combination, actuator means mounted for angular movement through an angle less than 360 degrees, means included in said actuator means for performing actuation over a particular portion of said movement, control means adjacent said actuator means pivotable less than 360 degrees and having an intermediate position, means included in said control means providing the limits of the movement of said actuator means, means included in said actuator and control means for said control means to drive said actuator means in the same angular direction as said control means when the latter approaches one of its limits, means biasing said control means to pivot in the direction of its limit on the same side of said intermediate position as said control means so that said control means is normally in one of its limits forming one of the stable states of said mechanism, and means for overcoming said bias for urging said control means past said intermediate position to trip said mechanism into the other of the limits forming the other stable state of said mechanism.

4. Reversible switching apparatus having two stable states comprising, in combination, two position electrical switch means biased normally in one of its positions, actuator means mounted for pivotal movement through an angle less than 360 degrees, means included in said actuator means for actuating said switch means into its other position when said actuator means is in one end of its movement, control means adjacent said actuator means pivotable between first and second limits of movement less than 360 degrees and having an intermediate position between said limits, means included in said actuator and control means for said control means to drive said actuator means in the same angular direction as said control means when the latter approaches one of said limits, means biasing said control means to pivot in the direction of its limit on the same side of said intermediate position as said control means so that said control means is normally in one of its limits and said switch means is in one of its positions forming one of the stable states of said apparatus, and movable means whose direction of movement is controlled by said switch means for urging said control means past said intermediate position to trip said apparatus into the other of its stable states including said switch means into the other of its positions, thereby reversing the direction of movement of said movable means.

5. Reversible switching apparatus having two stable states comprising, in combination, two position electrical switch means biased normally in one of its positions, actuator means mounted for pivotal movement through an angle less than 360 degrees, means included in said actuator means for actuating said switch means into its other position when said actuator means is in one end of its pivotal movement, control means adjacent said actuator means pivotable between limits of angular movement less than 360 degrees and having an intermediate position between its limits, means included in said control means for providing said limits of movement for said actuator means, means included in said actuator and control means for said control means to drive said actuator means in the same angular direction as said control means when the latter approaches one of its limits, means biasing said control means to pivot in the direction of its limit on the same side of said intermediate position as said control means so that said control means is normally in one of its limits and said switch means is in one of its positions forming one of the stable states of said apparatus, and movable means whose direction of movement is controlled by said switch means for urging said control means past said intermediate position to trip said apparatus into the other of its stable states including said switch means into the other of its positions thereby reversing the direction of movement of said movable means.

6. Reversible switching apparatus having two stable states comprising, in combination, two position electrical switch means biased normally in one of its positions, actuator means mounted for angular movement through an angle less than 360 degrees, means included in said actuator means for actuating said switch means into its unbiased position when said actuator means is in one end of its movement, forked-shaped control means having a pair of legs, said control means being adjacent said actuator means and pivotable between limits of movement less than 360 degrees and having an intermediate position between said limits, means included in said actuator and control means for said control means to drive said actuator means in the same angular direction as said control means when the latter approaches one of its limits, means biasing said control means to pivot in the direction of its limit on the same side of said intermediate position as said control means so that said control means is normally in one of its limits and said switch means in one of its position forming one of the stable states of the apparatus, and movable means whose direction of movement is controlled by said switch means engaged with said control means between the legs thereof for contacting one of said legs and urge said control means past said intermediate position to trip said apparatus into the other of its stable states including said switch means into the other of its positions and thereby reverse the direction of movement of said movable means.

References Cited in the file of this patent

UNITED STATES PATENTS 971,307    Pierce et al. _____ Sept. 27, 1910